United States Patent [19]
Ward

[11] Patent Number: 5,822,906
[45] Date of Patent: Oct. 20, 1998

[54] PIT BLIND FOR INTERACTING WITH WILDLIFE AND METHOD OF INSTALLATION AND USE THEREOF

[75] Inventor: Patrick J. Ward, Lock Haven, Pa.

[73] Assignee: North Central Outfitters, Lock Haven, Pa.

[21] Appl. No.: 712,693

[22] Filed: Sep. 12, 1996

[51] Int. Cl.$^6$ .................. A01M 27/00; E04H 15/00; E04H 15/32
[52] U.S. Cl. .................. 43/1; 135/901; 135/905
[58] Field of Search .................. 43/1; 135/117, 135/901, 905, 115, 900

[56] References Cited

U.S. PATENT DOCUMENTS

| | | |
|---|---|---|
| 2,629,348 | 2/1953 | Kifferstein . |
| 2,816,297 | 12/1957 | Stanley .................. 43/1 |
| 2,992,503 | 7/1961 | Webb . |
| 3,513,605 | 5/1970 | Smith . |
| 3,848,352 | 11/1974 | Sayles .................. 43/1 |
| 3,886,678 | 6/1975 | Caccamo .................. 43/1 |
| 4,224,754 | 9/1980 | Derryberry .................. 43/1 |
| 4,364,193 | 12/1982 | Visco .................. 43/1 |
| 4,581,837 | 4/1986 | Powlus . |
| 4,585,020 | 4/1986 | Masuda et al. .................. 135/901 |
| 4,738,045 | 4/1988 | Cardozo . |
| 4,751,936 | 6/1988 | Zibble et al. . |
| 4,782,616 | 11/1988 | Hambleton .................. 43/1 |
| 5,075,999 | 12/1991 | Fredericks . |
| 5,477,875 | 12/1995 | Daly, Jr. . |
| 5,479,738 | 1/1996 | Danna . |
| 5,647,159 | 7/1997 | Latschaw .................. 43/1 |

OTHER PUBLICATIONS

Cabela's Fall '96 Annual Catalog, p. 328, Sep. 1996.

*Primary Examiner*—Charles T. Jordan
*Assistant Examiner*—Theresa M. Wesson
*Attorney, Agent, or Firm*—Lowe Hauptman Gopstein Gilman & Berner

[57] ABSTRACT

A pit blind for hunting and observing waterfowl includes a lightweight, low profile molded shell that is contoured for use by a single reclining individual. The shell is placed in a shallow open hole dug into the ground. A low profile cover is placed on top of the shell, with camouflage material placed on the cover to conceal the user. The cover is made of hinged panels, allowing the user lying in a horizontal prone position within the shell to rapidly push up the cover panel overlying the upper torso, sit up and take aim at approaching waterfowl. While reclining in the pit blind with a firearm, the user can point the barrel of the firearm through gun ports in the cover.

25 Claims, 8 Drawing Sheets

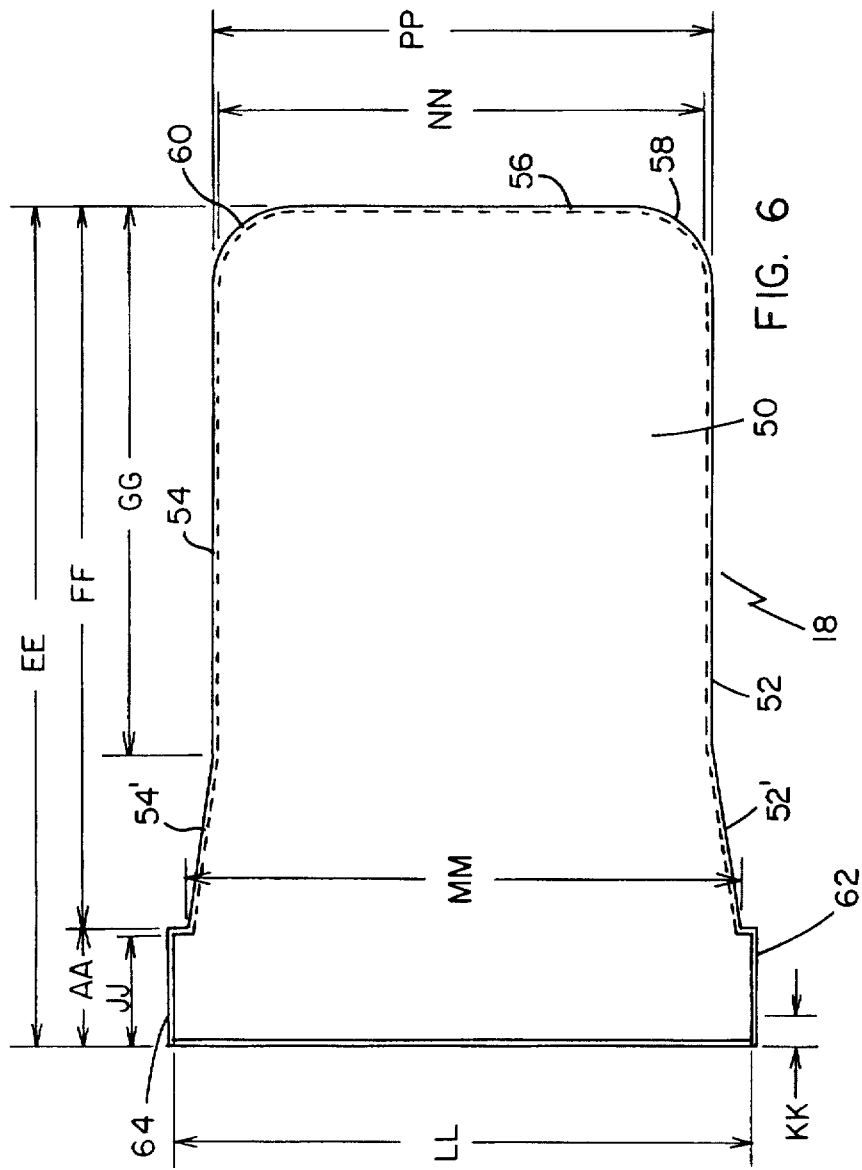
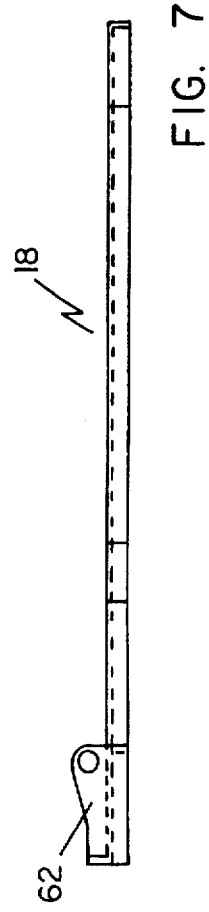
FIG. 6
FIG. 7

PIT BLIND FOR INTERACTING WITH WILDLIFE AND METHOD OF INSTALLATION AND USE THEREOF

TECHNICAL FIELD

The present invention relates to a blind used for interacting with wildlife, including hunting and observing waterfowl, and more particularly, to a low profile molded shell with removable cover that is easy to install and conceal in an open field.

BACKGROUND ART

Interacting with nature, especially through hunting, bird watching and photography, is a popular activity. Blinds are often utilized to conceal individuals, pets and equipment in the wild to facilitate these types of interaction by allowing wildlife to approach the blind while behaving normally in their natural environment.

Some wildlife, especially waterfowl, land in large fields containing less than ten inches of ground cover. Large open fields are required by waterfowl because they offer a sense of security in that predators can be observed for a greater distance. Geese, for example, require large open fields not only for predator observation, but for long runs required prior to taking flight. Field obstructions greater than ten inches in height would interfere with a take-off run, and therefore obstructions in open fields observed by geese in flight would cause the geese to avoid the area. Many blinds, therefore, cannot be located in the middle of a potential landing field, forcing the user to remain nearer the perimeter and therefore farther from the wildlife.

Most waterfowl will land in an open field or marsh such that their landing approach is directly into the wind. Portable blinds can initially be positioned to account for wind direction, and repositioned as required should the wind change direction. Blinds which are not portable, or are not easily repositioned, cannot change position when there is a significant change in the wind direction, decreasing the overall effectiveness of the blind.

Blinds of various designs are well known in the art, including pit blinds and surface blinds, permanent blinds and portable blinds. For example, U.S. Pat. No. 5,479,738 to Danna describes a pit blind that is relatively large and heavy, built to be occupied by multiple individuals, cannot be transported and installed by an individual, and can only be partially buried in the ground. This type of blind cannot be located in the middle of a landing field for waterfowl, for example, due to its formation of surface irregularities, thereby interfering with the landing area of waterfowl that require minimal surface irregularities. Thus, a unit of the type described by Danna is limited to use on the perimeter of a landing field for waterfowl.

U.S. Pat. No. 4,751,936 to Zibble et al. describes a surface blind that rests on the ground surface, covering and concealing an individual utilizing a foldable frame with a hinged top segment. The hinged top segment permits an individual to rapidly transition from a prone position to a sitting position in order to shoot nearby waterfowl. While Zibble et al. is portable and conceals an individual, it does not offer the user protection from the elements, and therefore cannot be utilized in a marsh-type environment, for example. Also, Zibble et al., being situated on top of the ground, is not necessarily transparent to wildlife which can observe surface irregularities, thereby avoiding the potential landing zone.

It is accordingly a primary object of the present invention to provide a blind for interacting with wildlife that has the ability to conceal the user from the wildlife while limiting surface exposure of the blind above ground.

Another object is to offer protection from weather.

A further object is to provide a blind that is both easily transportable and easy for an individual to install and take advantage of wind direction.

A still further object is to provide a blind which allows for comfortable concealment while a user is lying down, and permits the user to rapidly rise to a sitting position as may be required for shooting waterfowl.

DISCLOSURE OF THE INVENTION

The present invention was conceived for use as a blind for hunters as well as individuals interested in observing wildlife up close in their natural environment. The blind according to the present invention is attained utilizing a shell that is light weight and can be easily transported. A shell cover is positioned over the top of the shell for concealment of the blind and protection of the user from weather. The lower shell is large enough for an individual to lie in, but of sufficiently shallow depth to facilitate placement within a shallow hole that is easily dug into the ground such that the shell upper edge is approximately flush with the ground surface.

The lower body shell, in the preferred embodiment, is preferably formed as a molded insert of one piece construction that includes a bottom and side walls integrally formed therewith. A lip defines the upper edge of the shell side walls and is adapted to lie flush on the ground surface surrounding the hole. The cover attaches to the lower body shell by resting on the lip or by interfitting therewith, thereby protecting the user from weather as well as concealing the user. The cover is preferably made of multiple waterproof hinged sections, preferably waterproof material, with a lower body cover attached to the lower body shell to cover the lower body and legs of the user, and a separate upper body cover panel hinged to the lower body cover to cover the upper torso. This hinged arrangement advantageously allows the concealed user to quickly pivot the upper body cover towards the lower cover permitting the user to sit up quickly and discharge a firearm at nearby targets, for example waterfowl, or to create an open area for ingress and egress from the blind.

In accordance with another aspect of the invention, the cover is also equipped with camouflage ties downs, allowing fodder to be attached to the shell and thereby enhancing concealment.

The cover may also be equipped with one or more gun ports respectively communicating with cover side edges. This advantageously enhances safety of the concealed reclining user by permitting the barrel of a firearm to protrude through the port and be pointed outside the shell cover and therefore away from the user.

A method of constructing a pit blind according to the present invention is also disclosed. The method comprises the steps of 1. inverting the shell and tracing an outline of the shell on the ground;
2. digging a shallow hole within the tracing, the hole dimensions approximating the length, width and depth of the shell;
3. placing the shell inside the hole such that the bottom of the hole supports the bottom of the shell, or alternatively, portions of the hole surface supports various portions of the shell, adjusting the hole as necessary to allow the shell edges to be approximately flush with the ground;

4. placing the cover on the shell, and attaching the cover to the shell edges;

5. placing fodder on the upper portion of the cover soil, or other camouflage material on the lower portion of the cover.

Still other objects and advantages of the present invention will become readily apparent to those skilled in the art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 6 is a top plan view of the lower body cover portion of a removable cover;

FIG. 7 is a side elevational view of the lower body cover of FIG. 6;

BEST MODE FOR CARRYING OUT THE INVENTION

Figure 1:
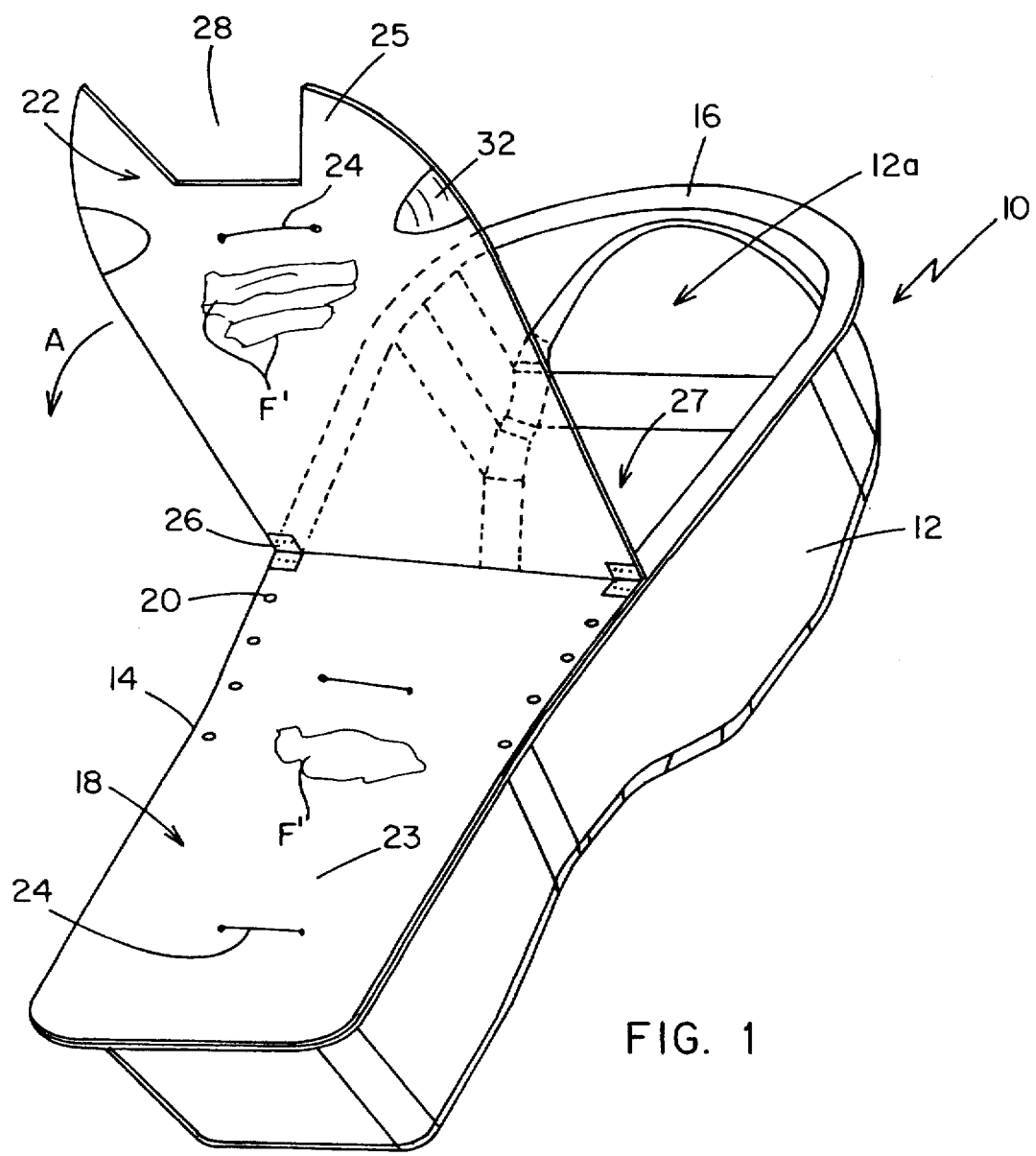
FIG. 1 is a perspective view of the pit blind according to a preferred embodiment of the present invention.
Figure 2:
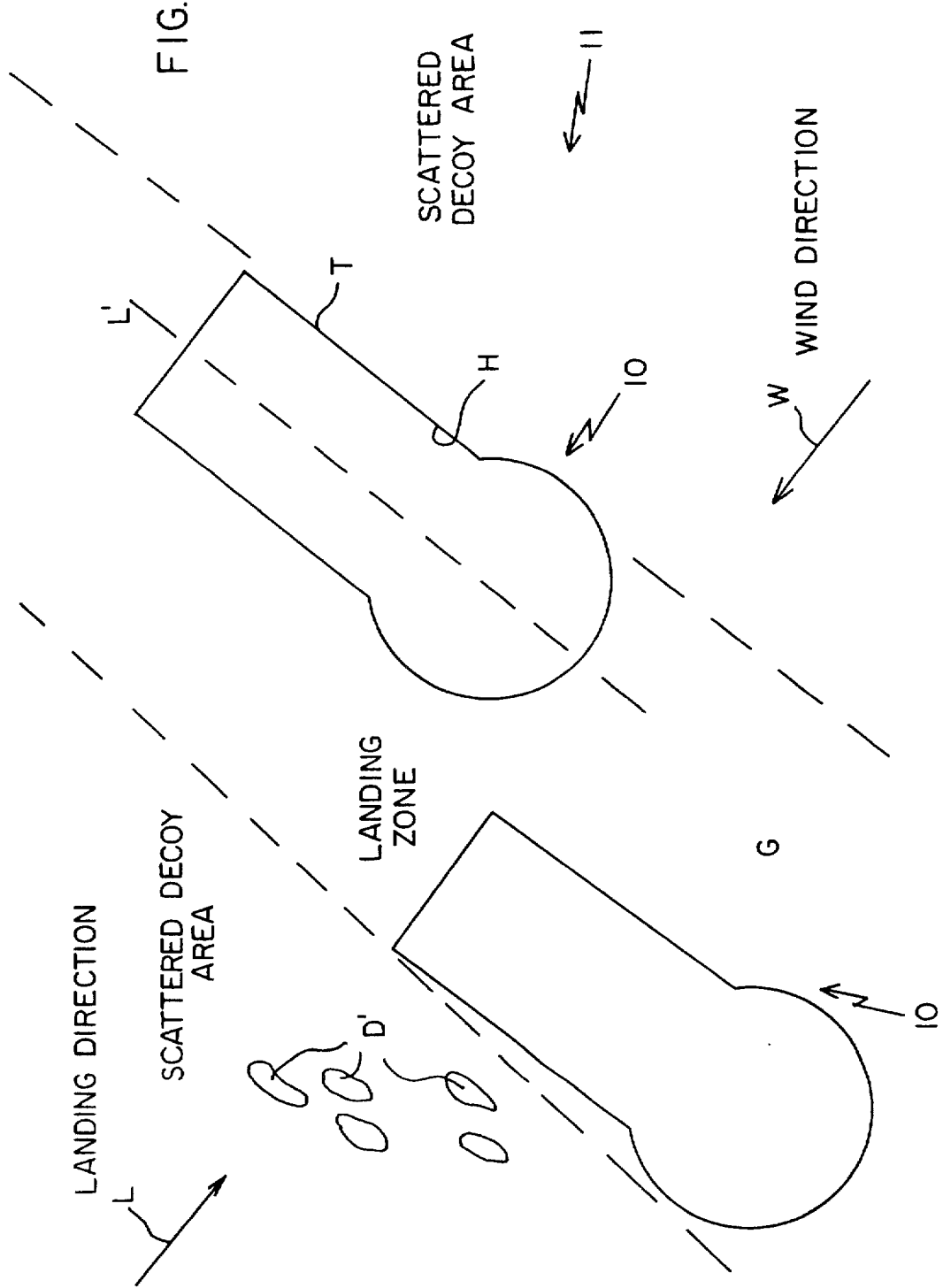
FIG. 2 is a plan view, partly in schematic form, depicting the placement of the pit blind according to the present invention in a field relative to wind direction.

Referring to FIGS. 1 and 2, a pit blind of the invention, generally designated with reference numeral 10, is comprised of a lower body shell 12 adapted to be disposed substantially entirely within the ground G as a liner, and a removable cover 14 for positioning on the shell at approximately ground level and upon which fodder or other camouflaging material F' can be positioned to substantially entirely cover the blind and prevent detection by approaching wildlife. Pit blind 10 is intended generally for use within an open field 11 to enable a user to observe wildlife and particularly to allow a hunter to hunt waterfowl by means of placement of one or more decoys D' within the field and positioning of the pit blind 10 adjacent to, or surrounded by, decoy areas.

To effectively utilize pit blind 10, the lower shell 12 and removable cover 14 are usually transported as a unit with a vehicle to a suitable field 11, which has typically been harvested and, therefore, has remaining ground cover or obstructions less than 10" in height. After determining wind direction W and landing direction L (i.e. which is 180° to the wind direction to achieve a head wind landing approach), the pit blind 10 can then be situated such that a longitudinal axis L' thereof is generally perpendicular to landing direction L. In FIG. 2, after further determining whether the pit blind 10 is to be used by either a left-handed or right-handed hunter, the pit blind 10 is easily installed by first inverting the lightweight lower body shell 12 to place the upper lip 16 thereof flush on the ground G. This allows the user to trace the outline T of the shell 12. After removal of the shell 12, an installation hole H is then excavated within the confines of the tracing T to a sufficient depth that will allow the shell to be disposed within the hole H in supporting contact with the ground surface, either in intimate contact throughout the entire shell bottom or at specific areas to stably support the shell and the weight of the user. As will be discussed more fully below, since the lower body shell 12 has a variable contoured height that generally does not exceed 18" in the preferred embodiment, and because the nominal length and width is dimensioned to only slightly exceed a large user's overall height and girth, excavation of hole H occurs in a relatively rapid and easy manner. Properly positioned, the upper lip 16 is approximately flush with the adjacent unexcavated ground surface, or overlies it.

At this point, the removable cover 14 is placed on the lower body shell 12. As best depicted in FIG. 1, the removable cover 14 is comprised of a lower body cover portion 18 shaped to cover the user's legs and lower torso when fixedly disposed in such a position with the upper lip 16 of the lower body shell 12. The peripheral edge of the lower body cover 18 may be screwed to the horizontally extending upper lip 16 with screws 20 tightened by wing nuts (not shown) for secure, fixed positioning. The removable cover 14 further includes an upper body cover portion 22 hinged to the lower body cover 18 to cover the remaining opening area of the lower body shell 12 when pivoted downwardly into its lower covering position. Camouflaging material F' such as soil and local fodder is disposed on the outer surface 23 of the lower body cover portion 18 loosely and with the use of tie down straps 24. Fodder is also attached with tie down straps 24 to cover the outer surface 25 of the upper body cover 22. The user will determine the degree and type of camouflage F' necessary, consistent with surrounding field conditions, to effectively hide pit blind 10 from approaching wildlife and/or waterfowl.

Figure 9:
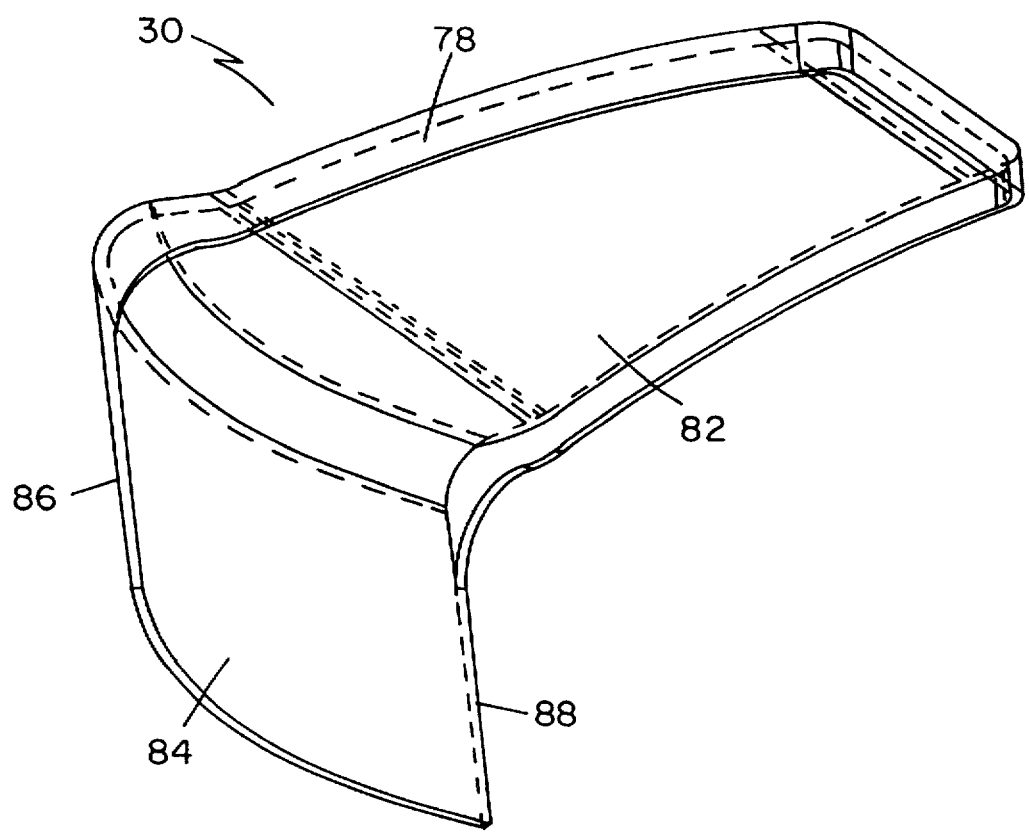
FIG. 9 is a perspective view of a protective hood used to cover the viewing window in the upper body cover during inclement weather and periods of non-use of the blind.

In use, therefore, the camouflaged upper body cover 22 is pivoted upwardly from the shell 12 in the direction of arrow A towards the lower body cover 18 (FIG. 1), enabling the user to enter the interior compartment 12a of the shell 12 through the exposed opening 27, along with any desired equipment such as a camera or firearm. Upon lying within the shell 12 in a prone position with the user's legs and lower torso disposed beneath the lower body cover portion 18, the user pivots the upper body cover 22 about the hinge 26 back to the closed position. The user's face is situated beneath a cut out opening 28 formed in the upper body cover 22. Fodder material or a camouflage hood as known in the art can be used to screen the user's face from approaching wildlife. This screening function can also be achieved with a vertically movable shield 30 (FIG. 9) described in more detail below. If hunting, the user's firearm can be positioned with the gun stock oriented across the user's chest with the gun barrel projecting outwardly through the upper body cover 22 through a shielded gun port 32 conveniently molded therein. This safety feature allows the user to rapidly open the upper body cover 22 by pushing it upwards without disturbing the gun positioning. The user can then lift his or her upper torso and assume a sitting position to then quickly and easily take aim and shoot surrounding waterfowl lured to the area of the pit blind 10 as a result of excellent camouflaging and low profile afforded by the structure of the present invention.

Figure 3:
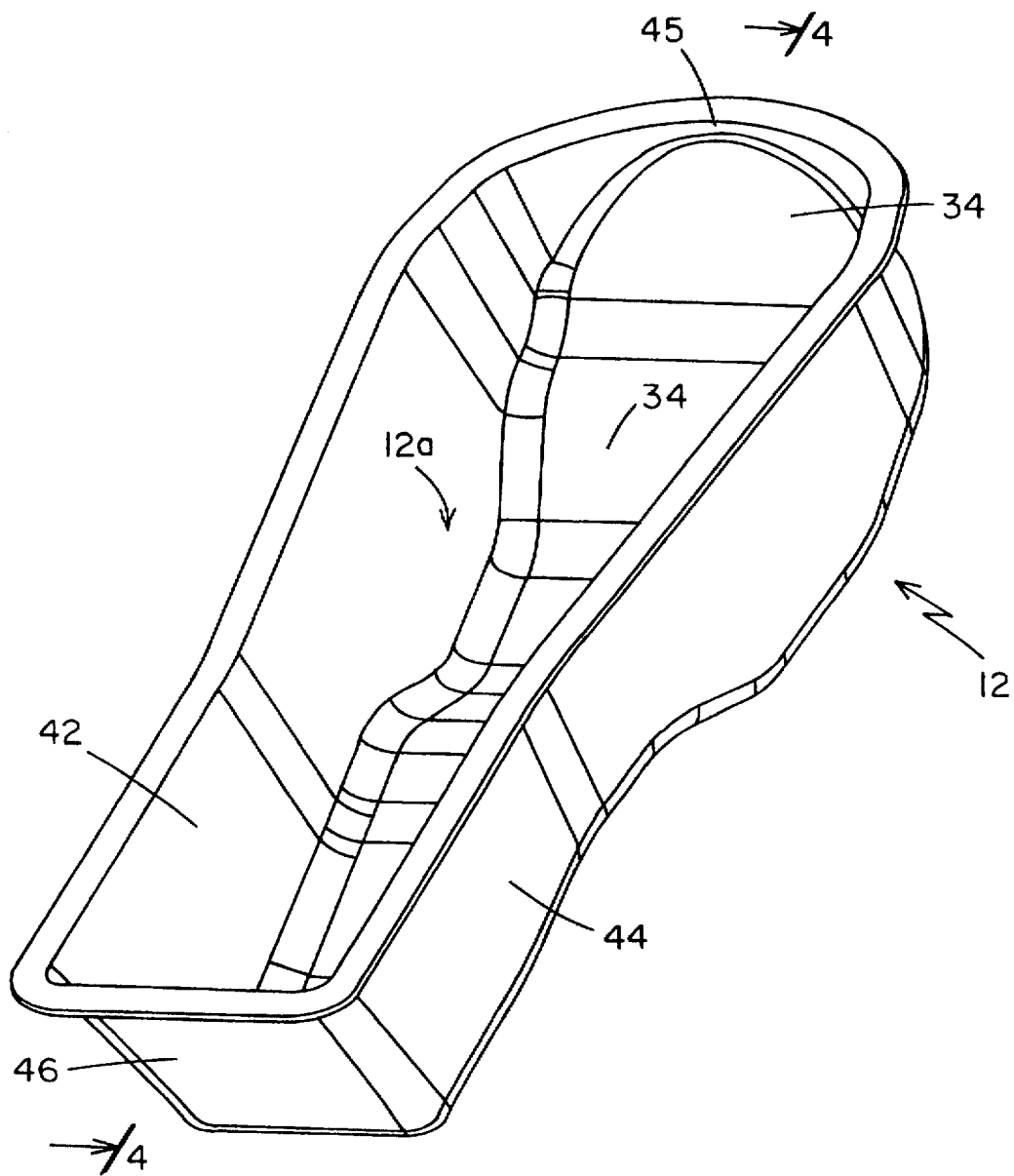
FIG. 3 is a perspective view of the lower body shell of the pit blind.
Figure 4:
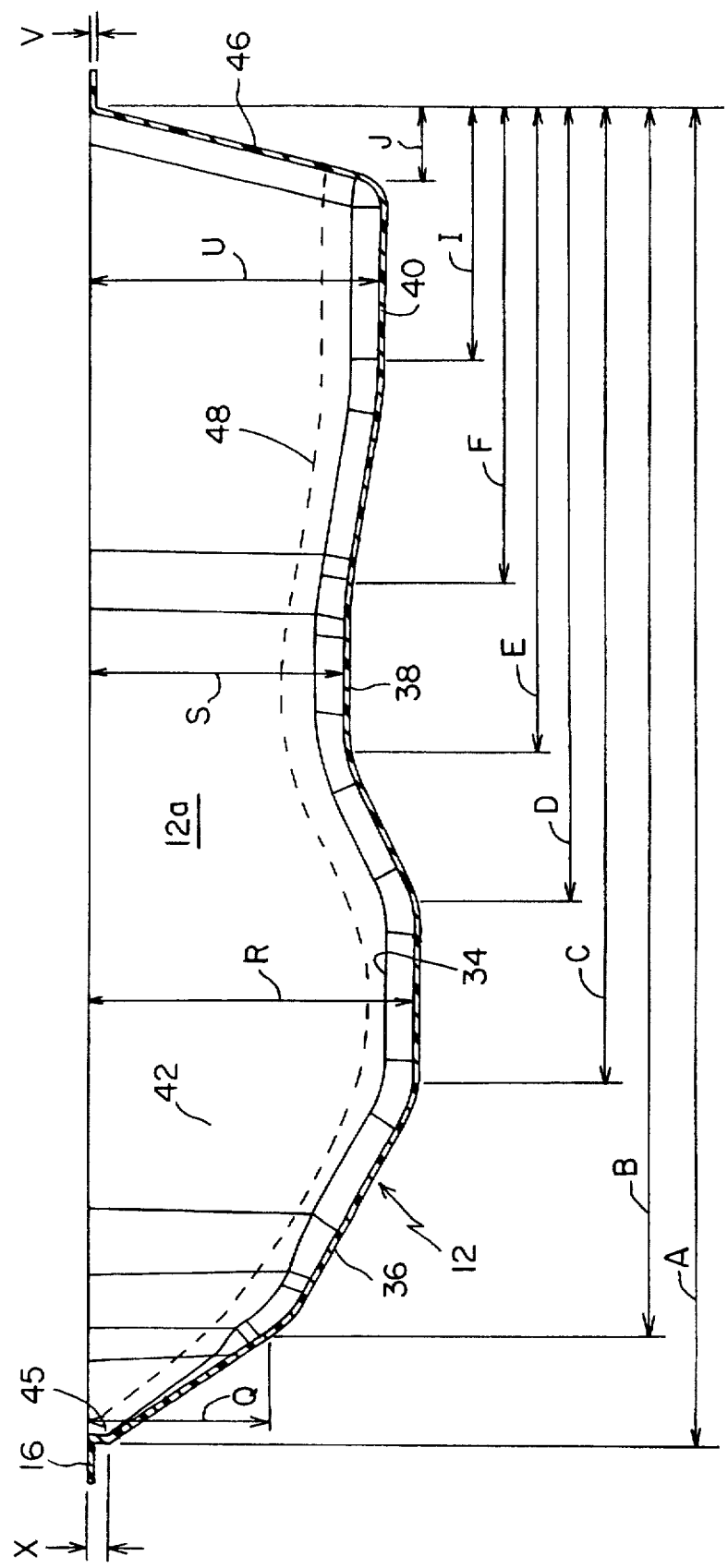
FIG. 4 is a sectional elevational view taken along the line 4—4 of FIG. 3.
Figure 5:
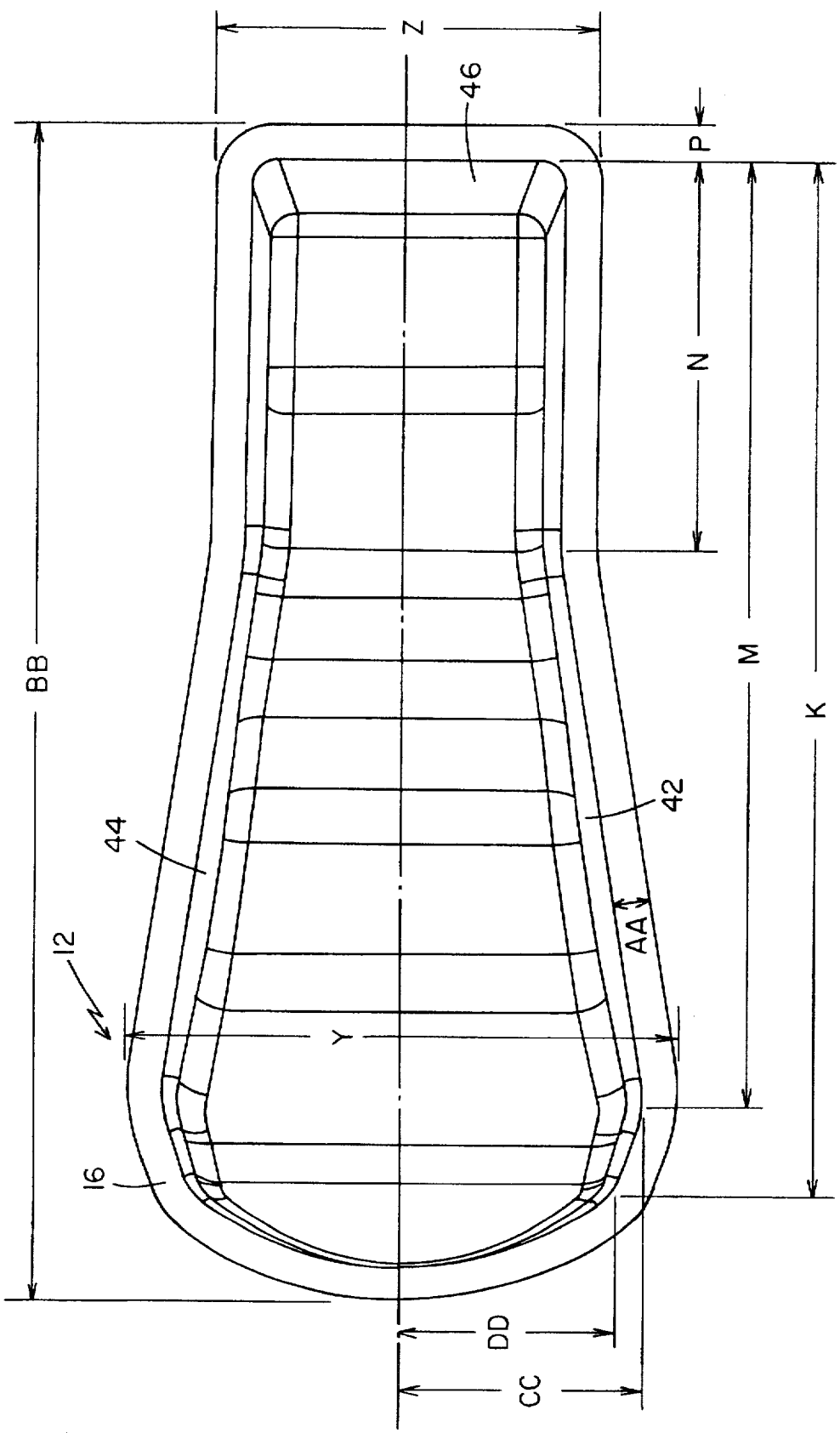
FIG. 5 is a top plan view of the lower shell of FIG. 4.

Referring to FIGS. 3–5, the lower shell 12 is preferably formed (vacuum molded) from plastic or fiberglass materials so as to have a unibody construction that is water proof to prevent the ingress of ground water and surrounding materials from within the excavated hole. To provide comfort to the prone or reclining user stretched out within the lower shell 12 during use, the shell bottom 34 is preferably contoured as best depicted in FIG. 4. Therein, the back supporting portion 36 is generally concave and slopes gradually upward towards the one end of the shell 12 located beneath the upper body cover 22. The mid portion 38 of the shell bottom 34 may be formed as a convex portion to support the user's thighs and calves. The opposite end 40 of the shell bottom 34 is either flat or slightly concave to support the user's ankles and feet. Overall, the resulting profile of the bottom surface depicted in FIG. 4 tends to locate the user's chest elevationally above the remaining portions of the body to avoid interference with heart and blood pumping function.

The lower shell 12, still with reference to FIGS. 3–5, further includes a pair of longitudinally extending side walls 42, 44, integrally formed to project upward from the side edges of the shell bottom 34. The ends of sidewalls 42, 44 located adjacent the foot supporting section 40 of the shell bottom 34 are generally connected by a substantially flat transverse wall 46 while opposite longitudinal ends of the side walls 42, 44 are curved towards each other to smoothly join as at 45 at the head portion of the shell bottom (see, particularly, FIGS. 3 and 5).

The side and end walls 42, 44, 46 are preferably outwardly tapered in the direction of the upper lip 16. This construction minimizes the volume of dirt that must be excavated to form the hole H to accommodate the shell 12 in proper ground supporting contact with the upper lip 16 either flush or slightly above the ground surface.

It is within the scope of this invention to form the lower body shell 12 from one or more members connected together and from other materials that are not necessarily waterproof materials or materials otherwise joined in a water proof manner. For example, it is within the scope of this invention to form the lower body shell 12 from one or more pieces of wood or wood-based products. If desired, a plastic liner (not shown) can line the shell 12 interior (or bottom thereof) to provide waterproof qualities. It is also possible for the user to wear waterproof clothing to provide necessary shielding from the hostile environment. Of course, although it is a highly desirable feature to form the shell bottom 34 in the advantageous contoured manner described above, it is also within the scope of this invention to form the shell 12 so as to have a uniform, rectangular cross-section between the shell bottom 34 and upper lip 16. The lip 16 is also an optional feature, although highly preferred, to provide an attachment surface for the lower body cover 18.

The lower body cover portion 18 is depicted in FIGS. 6 and 7 and generally comprises a flat cover panel 50 having substantially parallel longitudinal edges 52, 54 spaced apart to overlie corresponding laterally spaced portions of the upper lip 16. The panel 50 is formed with a transversely extending edge 56 respectively connected to edges 52, 54 through radiused corners 58, 60 to overlie corresponding areas of the upper lip 16 and prevent the ingress of moisture into the shell 12 interior and/or ensure proper supporting contact with the shell lip 16 to support camouflage material F' disposed thereon. The longitudinal edges 52, 54 may be formed with outwardly tapered portions 52', 54' terminating in a pair of upstanding hinge leaves 62, 64, respectively, to which corresponding hinge leaves 66, 68 in the upper body cover portion 22 (FIGS. 1 and 8) may be joined with bolts (or other type of preferably waterproof hinge pin means), to define a transverse pivot axis between the lower and upper body cover portions 18, 22.

The lower body cover portion 18 may also be formed as a single molded member (e.g. by injection molding) from plastic or fiberglass or other types of materials as described above in connection with the lower body shell. The lower body cover 18 can also be formed from flexible materials (e.g., a stretched cloth or canvas) sufficient to support the weight of camouflaging material. Obviously, from the foregoing description, the periphery of the lower body cover 18 can be varied, depending upon the shape of the upper lip 16 of the shell body 12.

As mentioned above, the upper body cover 22 is further formed with a cut-out opening 28 formed at an end thereof longitudinally opposite the hinge leaves 66, 68, with one or more of the shielded gun ports 70 respectively formed on longitudinal side edges 72, 74 intermediate the hinge leaves 66, 68 and cut-out opening 28. The overall periphery of the upper body cover portion 22 is shaped to generally overlie corresponding areas of the shell upper lip 16.

Figure 8:
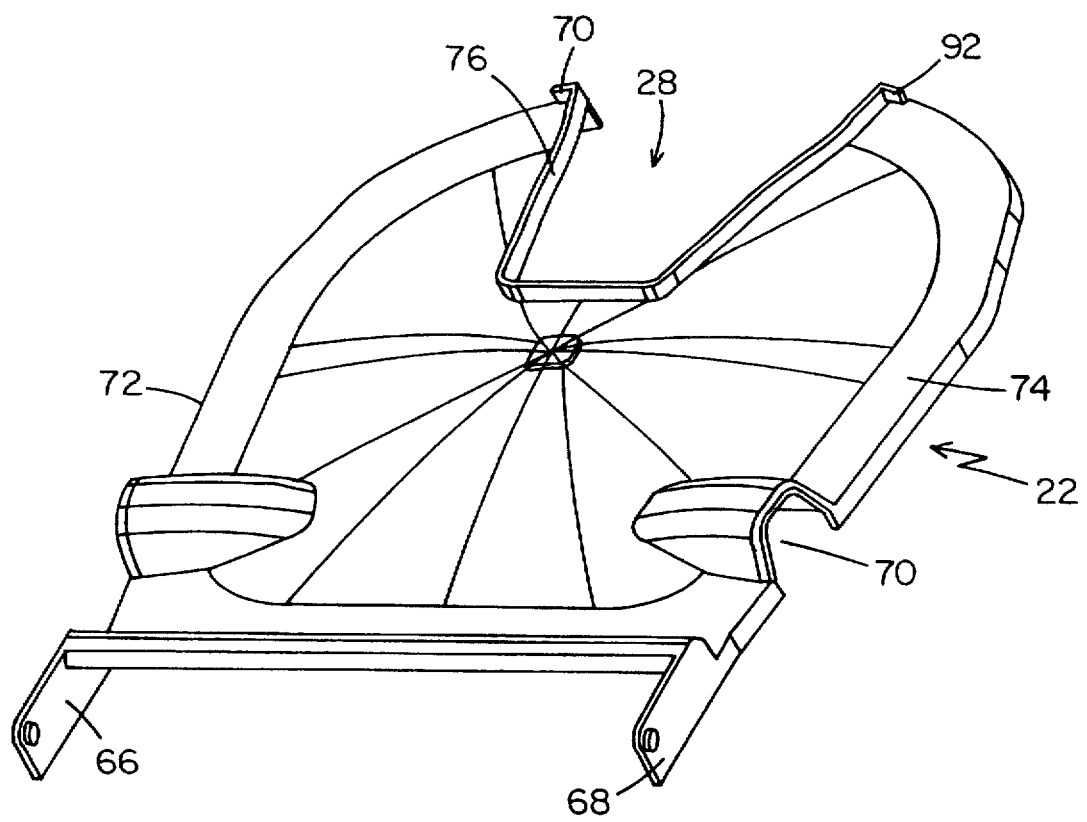
FIG. 8 is a perspective view of the upper body cover portion of the removable cover.

With reference to FIG. 8, the view cut-out opening 28 is preferably bordered with an upstanding integral protective lip 76 that advantageously prevents either fodder or rain from dripping into the shell interior.

The protective lip 76 also serves to matingly engage a downwardly depending peripheral skirt 78 formed along the horizontally extending portion 82 of the protective portion 82 and skirt 78 are dimensioned to cover the view cut-out opening 28 in its upper and lower operative positions (not shown in detail). In the lower position wherein the peripheral skirt 78 extends over to matingly engage the protective lip 76, the view cut-out opening 28 is effectively sealed from the external environment. This lower position is used to seal the lower shell 12 interior during periods of non-use. The opening of this cut-out 28 is effectively bridged and covered with an elongate, vertically extending curved panel 84 to complete the protective covering.

Opposite ends 86, 88 of this curved panel 84 may be respectively bolted to a pair of attachment ears 90, 92 located respectively on opposite sides of the cut-out 28 by means of screws and wing nuts so as to assume an upper or elevated locked position enabling the prone user to observe the surrounding environment through the vertical space between the protective lip 76 and the elevated hood skirt 78 overlying the cut-out opening. In this latter elevated position, the hood 30 prevents rain or snow from entering the cut-out opening 28, advantageously avoiding an obstructed view by the concealed user. Camouflage material can also be disposed on the top surface of the hood portion 82.

Although highly preferred, the protective hood 30 is an optional feature and its function can be satisfied by other means such as plastic sheeting or otherwise tenting the view opening 28.

Referring again to FIG. 4, an optional liner 48 (depicted in phantom line) can be disposed on the shell bottom 34 as insulation material preferably having an insulation factor greater than R-10 to protect the user from cold. A foam pad, preferably covered by waterproof material, having excellent insulative characteristics, may be used.

In summary, therefore, pit blind 10 of the present invention provides an economical and reliable approach to forming a pit blind that can be quickly and easily installed within a field or marshy location while providing maximum protection and concealment of the user from waterfowl within a rugged and hostile environment. The lower body shell 12, in the preferred embodiment, is formed from a light weight, vacuum molded plastic material having nominal dimensions set forth below to easily and comfortably contain a single prone user of varying size without requiring excavation of a deep or large hole other than that necessary to contain the shell. The shell 12 has a preferred thickness in the range of 0.1875" and weighs approximately 29 lbs. for easy transport by one or two individuals. The hinged lower and upper body cover portions 18, 22, being substantially flat panels, are easy and light weight to transport while being unobtrusive in operative position atop the shell 12, thereby facilitating placement of fodder and other camouflage material. During the vacuum molding process, the exterior surfaces of all cover sections are made with a rough texture to prevent any glare (from the sun).

Although not intended to be restrictive of the claimed invention, the following chart contains dimensional sizes for various parts of the pit blind 10 as denoted with reference letters A–PP as depicted in FIGS. 4–6 of the drawing:

| Reference Letter | Corres. Dimension, (Inches) |
| --- | --- |
| A | 74.0 |
| B | 66.0 |
| C | 54.0 |
| D | 44.0 |
| E | 36.0 |
| F | 27.0 |
| I | 14.0 |
| J | 4.0 |
| K | 69.0 |
| M | 63.0 |
| N | 27.0 |
| P | 2.0 |
| Q | 10.0 |
| R | 18.0 |
| S | 14.0 |
| U | 16.0 |
| V | .25 |
| X | 1.0 |
| Y | 38.1 |
| Z | 25.0 |
| AA | 2.251 |
| BB | 78.0 |
| CC | 18.0 |
| DD | 14.0 |
| EE | 44.375 |
| FF | 38.375 |
| GG | 29.35 |
| HH | 6.0 |
| JJ | 5.75 |
| KK | 1.50 |
| LL | 30.0 |
| MM | 28.606 |
| NN | 25.25 |
| PP | 25.75 |

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A pit blind for placement within an open hole dug in the ground to facilitate a user's interaction with nature, comprising:

an elongate shell for lining an inner surface of the hole and being formed with an upwardly directed opening of a sufficient size to enable the user's upper torso to extend therethrough, a shell cover adapted to cover said upwardly directed opening to conceal the user; and a shell lining made of thermally insulating material and adapted to cover the bottom of the shell.

2. A pit blind according to claim 1, wherein the shell is fabricated from molded plastic.

3. A pit blind according to claim 2, wherein said shell cover includes a plurality of hinged panels.

4. A pit blind according to claim 1, wherein the s hell has a bottom, two longitudinal side panels extending respectively upward from the side edges of the bottom, a transverse panel extending upward from the bottom between and connected to said side panels, and wherein the longitudinal side panels are connected at corresponding ends thereof to each other.

5. A pit blind according to claim 1, further comprising means for attaching the shell cover to the shell.

6. A pit blind according to claim 1, wherein the shell cover further comprises means for attaching camouflage material to conceal an upper surface of the cover and thereby the blind.

7. A pit blind according to claim 1, wherein the shell cover further comprises a plurality of gun ports.

8. A pit blind according to claim 1, wherein the shell cover further comprises a plurality of removable panels.

9. A pit blind according to claim 1, wherein the shell is waterproof.

10. A pit blind according to claim 1 wherein the shell lining is waterproof.

11. A pit blind according to claim 1 wherein the shell lining has an insulation factor greater than R-10.

12. A method of constructing a pit blind for interacting with nature, comprising the steps of:

a. digging a shallow hole of predetermined depth and contour to enable a user's body to be disposed therewithin in a reclining position;

b. lining the hole with an insert to isolate the user's body from contact with surrounding ground; and c. covering the insert and thereby the reclining user with a cover.

13. The method of claim 12; further comprising the step of attaching local fodder to the cover to camouflage the pit blind.

14. The method of claim 12, further comprising the step of the user pointing the barrel of a firearm through a gun port in the cover.

15. The method of claim 12, wherein the step of digging a shallow hole further comprises:

a. inverting the insert which is waterproof;

b. tracing an outline of the insert on the ground;

c. removing the insert thereby exposing the ground trace; and d. digging a shallow hole corresponding to the ground trace.

16. A method of using a pit blind for interacting with nature, comprising the steps of:

a. digging a shallow hole;

b. lining the hole with a waterproof insert; and c. concealing a user's body disposed in a reclining position within the insert.

17. The method of claim 16; further comprising the step of placing a hinged cover over the insert.

18. The method of claim 17, further comprising the step of the user pushing up and folding over a panel of the cover while raising the user's upper torso to an upright and sitting position.

19. The method of claim 17, further comprising the step of the user lifting a firearm and taking aim at approaching waterfowl.

20. A blind to facilitate a user's interaction with nature, comprising:

an elongate shell having a bottom adapted to contact a ground surface, and side members extending upward from the bottom; and a top mounted on the side members to define an interior compartment, said interior compartment including an interior bottom surface which is profiled to enable the user's body to be disposed in a reclining position supported by the bottom surface.

21. The blind of claim 20, wherein said shell includes an upwardly directed opening of a sufficient size to enable the user's upper torso to extend therethrough, and further comprising a shell cover adapted to cover said upwardly directed opening to conceal the user.

22. The blind of claim 20, wherein said bottom has a length greater than a height of said side members.

23. The blind of claim 22, wherein a portion of the bottom surface of said compartment located at one end portion of the compartment extends at an inclined angle relative to the top.

24. The blind of claim 23, wherein remaining portions of said bottom surface are profiled so that the user's body extends in a prone and lying down position while the upper torso is in a reclining position when said bottom is supported on a ground surface.

25. A method of using a blind having an elongated shell and a shell cover for interacting with nature, comprising the steps of:

(a) placing said elongated shell on a supporting ground surface; and (b) concealing a user's body, with said shell cover, disposed in a reclining position within the blind.

* * * * *